United States Patent [19]

Fujimoto et al.

[11] 3,938,163

[45] Feb. 10, 1976

[54] PRINTED PATTERN INCLINATION CONTROL IN INK JET PRINTER

[75] Inventors: Isao Fujimoto, Kunitachi; Takeshi Kasubuchi; Masahiko Aiba, both of Nara, all of Japan

[73] Assignees: Nippon Telegraph and Telephone Public Corporation; Sharp Kabushiki Kaisha, both of Osaka, Japan

[22] Filed: Jan. 17, 1974

[21] Appl. No.: 434,217

[30] Foreign Application Priority Data

Jan. 17, 1973 Japan .................................. 48-7495

[52] U.S. Cl. .................................................... 346/75

[51] Int. Cl.[2] .......................................... G01D 15/18

[58] Field of Search ........................................ 346/75

[56] References Cited

UNITED STATES PATENTS

| | | | |
|---|---|---|---|
| 3,136,594 | 6/1964 | Ascoli | 346/75 X |
| 3,657,599 | 4/1972 | Kashio | 346/75 X |
| 3,688,034 | 8/1972 | Kashio | 346/75 X |
| 3,805,274 | 4/1974 | Kashio | 346/75 X |

*Primary Examiner*—Joseph W. Hartary
*Attorney, Agent, or Firm*—Stewart and Kolasch, Ltd.

[57] ABSTRACT

In an ink jet printer of charge amplitude controlling type wherein a carriage travelling in a horizontal direction and carrying a nozzle for issuing ink drops and a charge electrode for charging the ink drops by voltage corresponding information sought to be recorded is provided together with a pair of high voltage deflection plates, a pair of compensation electrodes are provided on the carriege to establish an electric field being at right angles to the direction of the electric field formed by the deflection plates and voltage to the compensation electrodes is adjustable thereby to control inclination of a printed pattern.

9 Claims, 5 Drawing Figures

FIG. 3
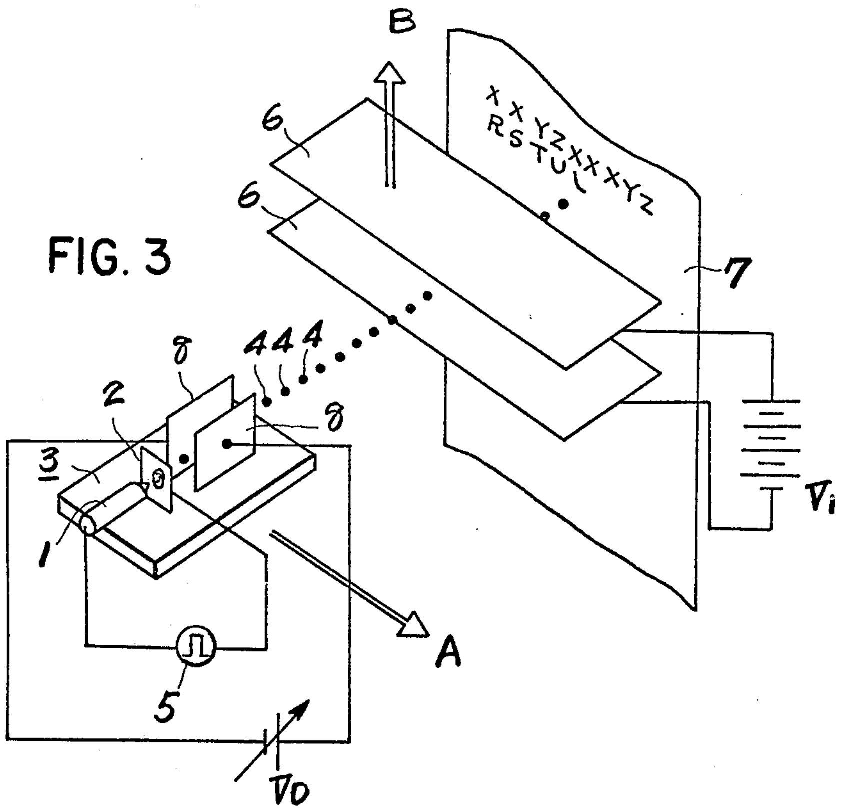
FIG. 4
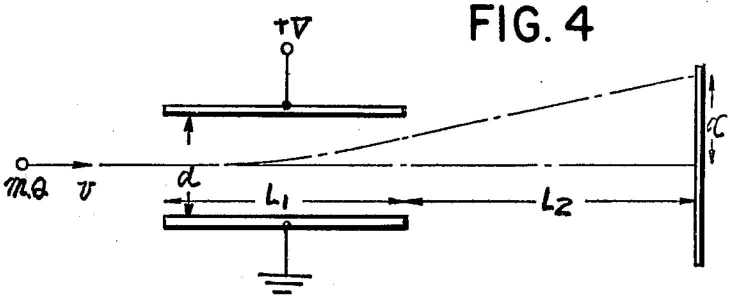
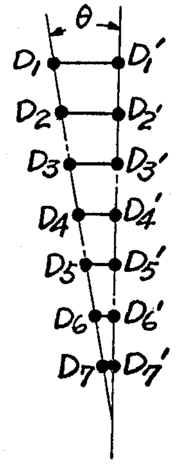
FIG. 5

PRINTED PATTERN INCLINATION CONTROL IN INK JET PRINTER

BACKGROUND OF THE INVENTION

In recording desired symbols in dot pattern with the use of a single-nozzle ink jet printer of the charge amplitude controlling type, deflection in the column direction of the dot pattern is accomplished by controlling the charge amplitude on individual ink drops in a manner to produce differences in the amount of deflection between the ink drops as they pass between a pair of high voltage deflection plates, while deflection in the row direction, however, is not practised by any charge amplitude means. For this reason the carriage carrying a nozzle and a charge electrode thereon is constructed and arranged to travel in the row direction for substitution therefor. The carriege, therefore, travels necessarily in the row direction even during the period of time where printing is made for a column of the dot pattern, with the results that inclination of the printed pattern occurs inavoidably at a fixed angle with respect to the column or vertical direction. Such inclination, in general, is not preferrable. It is desired from a consideration of fine printing and a variety of symbol recording that an inclination angle is adjustable at the operator's option.

SUMMARY OF THE INVENTION

Accordingly, it is an object of this invention to provide an ink jet printer of the charge amplitude controlling type wherein the inclination of the printed pattern is adjustable at the operator's option.

To achieve this, there is provided on a carriege carrying a nozzle and a charge electrode a compensation electrode to provide an electric field for deflecting ink drops having individual charges thereon in a row direction and hence, in the direction of motion of the carriage. The inclination angle of the printed pattern is adjustable by controlling the voltage applied to the compensation electrode.

BRIEF DESCRIPTION OF THE DRAWINGS

FIG. 3 is a perspective view showing a preferred embodiment of this invention.

FIG. 4 is a sectional view through a pair of deflection plates for purpose of explaining normal deflection amounts in the embodiment of FIG. 3.

FIG. 5 is a chart for purpose of explaining compensation deflection amounts in the embodiment of FIG. 3.

DETAILED DESCRIPTION OF THE PREFERRED EMBODIMENTS

To facilitate understanding of this invention, before discussing embodiments of this invention in greater detail, it may be of advantage to explain the principal concept of conventional ink jet printers of the charge amplitude controlling type and reasons for inclination of printed patterns generated by them.

Figure 1:
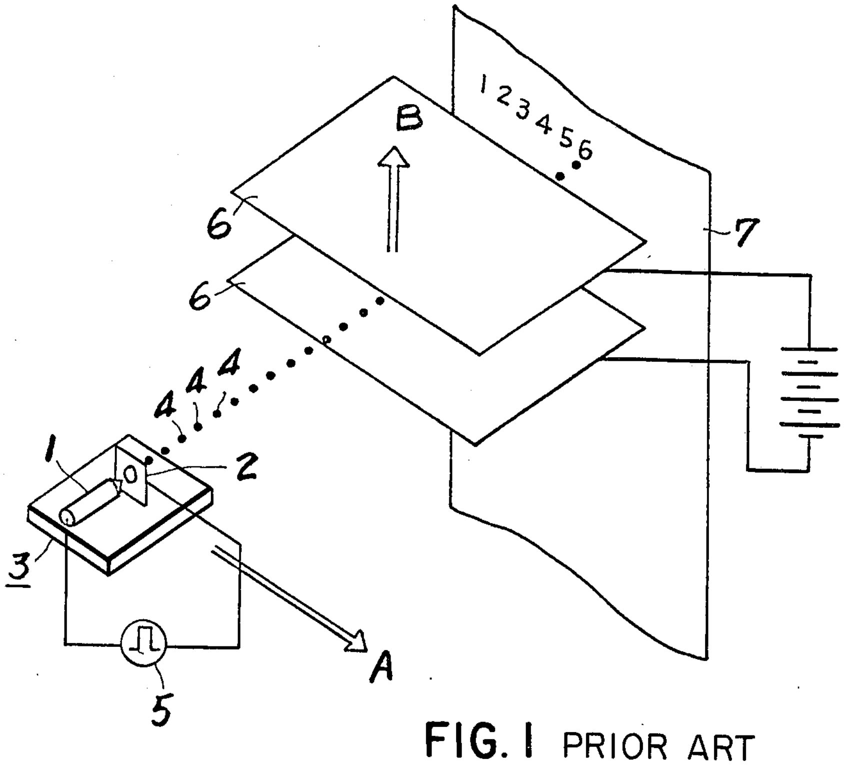
FIG. 1 PRIOR ART
FIG. 1 is a perspective view schematically showing the construction of a conventional ink jet printer.
Figure 2:
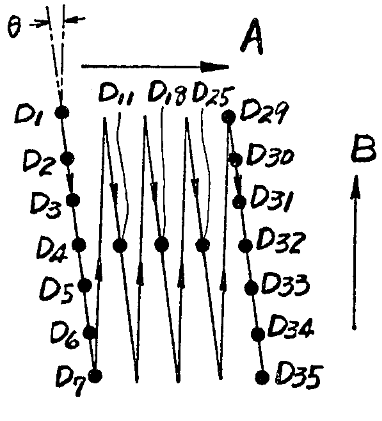
FIG. 2 PRIOR ART
FIG. 2 is a chart showing an example of a printed pattern obtained from the conventional printer of FIG. 1.

Referring to FIGS. 1 and 2 illustrating a conventional ink jet printer of the charge amplitude controlling type, a carriage 3 carrying a nozzle 1, a charge electrode 2, etc., travels in a horizontal direction as indicated by the arrow A for recording symbols such as characters in dot matrix. Ultra-sonic vibration is imparted to an ink stream issuing under pressure from the nozzle 1 to form ink drops 4 in synchronization with the ultrasonic vibration cycle. Then, the ink drops 4 are charged in accordance with recording signals 5 with the use of the nozzle 1 and charging electrode 2 and the wake of the ink drops 4 is electrostatically deflected in accordance with the amplitude of the charges on the drops as they pass through the electric field established by the high voltage deflection plate pair 6 so that desired symbols such as characters are recorded on a record receiving member 7 such as paper in a dot matrix. Deflection by the high voltage deflection plates 6 is accomplished only in the column direction of the pattern as indicated by the arrow B while horizontal movements as indicated by the arrow A are substituted for deflection in the row direction of the dot matrix. That is, the recorded symbols are shifted by degrees in the carriage travelling direction.

FIG. 2 shows the sequence of scanning or deflection in writing a capital letter H. Each number suffixed to the individual ink drops corresponds to the order of occurrence of that dot in the writing. In general, in the above described type of ink jet system printer, charge amounts and hence, the deflection amounts for the ink drops deposited on the upper points in the drawing are large than that on the lower points. The reason for employing downward scanning is that the ink drops with the large deflection amounts are allowed to precede others to reduce a degree of recording distortions.

When scanning of the individual columns of the dot matrix is performed beginning at the uppermost points and ending at the lowest points as the carriage 3 travels in the horizontal direction as indicated by the arrow A, the recorded symbols incline necessarily in a direction opposed to the carriage travelling direction A. Conversely, in the case where scanning is performed upward, the recorded symbols incline in the same direction as the carriage is travelling. It is desired that the inclination angle of the printed pattern be "zero".

This invention is to provide an ink jet system printer wherein the inclination angle $\theta$ of the printed patterns is controllable.

FIGS. 3 through 5 show a preferred embodiment of this invention. The reference numerals used to designate selected components of the FIG. 1 ink jet printer will be used, wherever practical, to designate those same components in the system of FIG. 3.

On the carriege 3 carrying the nozzle 1 and the charging electrode 2 there is provided a pair of compensation electrodes 8 in such a manner that a compensating electric field formed by them develops in the same direction as the carriage travelling direction A. The ink drops 4 having individual charges thereon corresponding to the recording signals 5 pass through the pair of compensation electrodes 8.

Referring now to FIG. 4, the deflection amounts $\alpha$ on the record receiving member can be expressed as the following formula wherein $V/d$, $L_1$, $L_2$, $m$, Q, $v$ signify the intensity of the electric field, the length of the deflection electrodes, the distance between the terminating ends of the deflection electrodes and writing surface, the mass of the charged drops, the charge amplitude, and the velocity, respectively, if there is no air resistance:-

$$\alpha = \frac{VQ\,(L_1L_2 + \frac{1}{2}L_1^2)}{d \cdot m \cdot v^2}$$

In other words, the deflection amount $\alpha$ is in proportion to the deflection voltage $V$ and the charge amplitude Q. As well known in the design of the charge amplitude controlling type of ink jet system printer, the deflection voltage $V$ is constant and thus the deflection amount $\alpha$ is controlled by the charge amplitude $Q$.

Now, considering the first column of the dot pattern for purpose of writing the capital letter H, the individual writing ink drops $D_7$, $D_6$, $D_5$, $D_4$, $D_3$, $D_2$, $D_1$ have the different charge amplitudes $q$, $2q$, $3q$, $4q$, $5q$, $6q$, $7q$, respectively. The dots $D_1$–$D_7$ of FIG. 5 correspond to the equivalencies of FIG. 2. The inclination angle $\theta$ is a limited value.

It is needed to adjust the positions of the dots $D_1$–$D_7$ as indicated by the dots $D_1'$–$D_7'$ for purpose of making the inclination angle $\theta$ zero. In the case where the required compensation displacement from the dot $D_7$ to the dot $D_7'$ is designated as $\beta$, the individual displacements from the remaining dots $D_6$, $D_5$, $D_4$, $D_3$, $D_2$, $D_1$ to the position-compensated dots $D_6'$, $D_5'$, $D_4'$, $D_3'$, $D_2'$, $D_1'$ are $2\beta$, $3\beta$, $4\beta$, $5\beta$, $6\beta$, $7\beta$ respectively.

The above described compensation can be realized by the compensation electrodes 8. Application of fixed D.C. voltage Vo to the compensation electrodes 8 results in the individual ink drops 4 being electrostatically deflected in the carriage travelling direction A due to compensation field thus formed between the compensation electrodes. Since the individual ink drops $D_1$–$D_7$ carry the different charge amplitudes $7q$, $6q$- - - , $q$ and the compensation electric field formed by the electrodes pair 8 is constant, analysis of the foregoing formula shows that the deflection amounts afforded in the row direction (that is, the carriage travelling direction A) to the ink drops $D_1$–$D_7$ are $7\alpha$, $6\alpha$, - - - , $\alpha$. By adjusting the D.C. voltage Vo to fulfill the requirements $\alpha=\beta$ , the positions of the ink drops $D_1$–$D_7$ can be moved to the desired positions $D_1'$–$D_7'$ thereby effecting the inclination angle $\theta$ (=) zero.

Although the inclination angle $\theta$ is reduced to zero in the illustrated embodiment, it may be reduced to a voltage value by properly adjusting the D.C. voltage Vo applied to the compensation electrodes 8. It should be understood from a consideration of the foregoing disclosure that the inclination angle $\theta$ of the printed pattern inherent to the charge amplitude controlling type of ink jet system printer can be selectively varied by varying the D.C. voltage Vo to the compensation electrodes 8 in writing operations. It is therefore possible to combine Gothic type characters with italic type characters.

Although the D.C. voltage $V_1$ to the deflection plates 6 should be of a sufficiently high level such as several thousand volts, the voltage Vo to the compensation electrodes 8 may be of a considerably low level such as several 10 volts in normally-sized systems, since the deflection amount $\alpha$ is a function of the distance $L_2$ between the terminating ends of the deflection electrodes and the writing surface as evidenced by the above formula.

WORKING EXAMPLE

Now assume that the ink droplet $D_1$, which carries the maximum charge amplitude thereon among the seven droplets, has the charge amplitude of $3 \times 10^{-12}$ coulomb.

As an example, numeral values corresponding to an actually operating system are put into the equation previously defined herein. Following values are represented in MKS system of units.

| | | | |
|---|---|---|---|
| $m = 1.27 \times 10^{-9}$ | kg | : | the drop mass |
| $q = 3.0 \times 10^{-12}$ | coulomb | : | the charge amplitude |
| $v = 18$ | m/sec | : | the drop velocity |

1. High voltage deflection plates 6, $V_1$

| | |
|---|---|
| $d = 7 \times 10^{-3}$ | m |
| $V_1 = 7 \times 10^{3}$ | volts |
| $L_1 = 15 \times 10^{-3}$ | m |
| $L_2 = 20 \times 10^{-3}$ | m |

From the equation the deflection amounts $\alpha$ on the record receiving member caused by the high voltage deflection plates 6 can be calculated as follows:

$\alpha = 3.12 \times 10^{-3}$ (m)

The deflection amounts approximate 3mm.

2. Compensation electrodes 8, Vo

| | |
|---|---|
| $d = 3 \times 10^{-3}$ | m |
| $Vo = 5 \times 10^{2}$ | volts |
| $L_1 = 5 \times 10^{-3}$ | m |
| $L_2 = 60 \times 10^{-3}$ | m |

From the equation the deflection amounts $\alpha$ on the record receiving member caused by the compensation electrodes 8 can be calculated as follows:

$\alpha = 3.80 \times 10^{-4}$ (m)

The deflection amounts afforded in the row direction, or 7 $\alpha$ o for the ink drop D, approximate 0.3 mm.

We claim:

1. An ink jet system printer comprising a nozzle for issuing a stream of ink drops at a fixed velocity, a charging electrode for charging the ink drops in accordance with signals to be recorded, a pair of high voltage deflection plates having a constant high voltage electric field therebetween and thus deflecting the ink drops passing between said plates in a first coordinate direction in accordance with the amplitudes of the individual charges on the ink drops, a record receiving member for forming images indicative of the signals by means of the deflected ink drops, carriage means mounting said nozzle and said charging electrode for relatively moving the nozzle, said charging electrode and said ink drops with reference to the record receiving member in a second coordinate direction resulting in an inclination of said images, and a pair of compensation electrodes mounted on said carriage means deposited between the charge electrode and the high voltage deflection plates having a compensation electric field of predetermined constant value in a different direction from the electric field formed by the high voltage deflection plates deflecting ink drops passing between said plates to modify said resulting inclination of said images in accordance with said value of said compensation field.

2. An ink jet system printer as defined in claim 1 wherein the nozzle travelling direction coincides with the direction of the electric field formed by the compensation electrodes.

3. An ink jet system printer as defined in claim 6 wherein intensity of the electric field between said compensation electrodes is adjustable to thereby correspondingly adjust inclination of said images.

4. An ink jet system printer comprising:

means for generating character signals;

a recording medium;

transitory means, including nozzle and charging electrode means responsive to said character signals for generating a stream of ink drops selectively charged in accordance with said character signals towards said recording medium, for substantially uniformly translating said ink drops in a first coordinate direction with respect to to said recording medium, thereby tending to impart an inclination to characters printed on said recording medium in accordance with said charging signals;

deflection means intermediate said charging electrode means and said recording medium electrostatically deflecting said ink drops in a second coordinate direction in an amount proportional to the charges thereon;

and electrostatic compensation means on said transitory means providing an electric field of constant value deflecting said charged ink drops in said first coordinate direction to modify the inclination of characters on said recording medium imparted thereto by the substantially uniform translation of said ink drops effected by said transitory means to thereby determine the ultimate inclination of characters printed on said recording medium.

5. The invention defined in claim 4 wherein said first and second coordinate directions are orthogonally disposed.

6. The invention defined in claim 4 wherein:

said transitory means effects substantially uniform horizontal translation of said ink drops with respect to said recording medium; and said deflection means effects vertical deflection of said ink drops with respect to said recording medium;

thereby providing a row and column matrix scanning pattern for each character printed on said recording medium, with each said character tending to be inclined from the vertical direction by said horizontal translation.

7. The invention defined in claim 4 wherein:

said first coordinate direction is horizontal with respect to said recording means;

said second coordinate direction is vertical with respect to said recording means;

thereby effecting a row and column matrix scanning pattern for each character to be printed, with each character tending to be inclined with respect to the vertical direction by said uniform translation; and said electric field of constant value of said compensation means is of a predetermined constant value precluding said inclination of said printed characters.

8. The invention defined in claim 7 wherein said electric field of said compensation means is selectively adjustable to predetermined constant values respectively determinitive of predetermined inclinations of said printed characters.

9. In an ink jet printer system for printing characters on a recording medium in a row and column dot matrix for each character by means of a horizontally transitory writing head generating a stream of charged ink drops charged in accordance with character signals for scanning the rows and electrostatic vertical deflection means acting on said ink drops between said writing head and said recording medium for scanning the columns of said matrix, the horizontal translation of said writing head imparting a predetermined inclination to the printed characters:

means selectively varying the amount of said inclination comprising horizontal deflection means mounted on said writing head in the path of said charged ink drops having an electric field of a selectively predetermined constant value acting horizontally on said ink drops, said constant value of of said electric field corresponding to a given inclination.

* * * * *